United States Patent Office 3,698,929

Patented Oct. 17, 1972

3,698,929

METALLIZING EXPANDED PLASTICS ARTICLES

Adolf Diebold, Ludwigshafen, and Matthias Marx, Bad Duerkheim, Germany, assignors to Badische Anilin- & Soda-Fabrik Aktiengesellschaft, Ludwigshafen (Rhine), Germany No Drawing. Filed June 18, 1969, Ser. No. 834,552
Claims priority, application Germany, June 22, 1968, P 17 71 661.9
Int. Cl. B44d *1/14*
U.S. Cl. 117—71 9 Claims

ABSTRACT OF THE DISCLOSURE

A method of metallizing the surface of expanded plastics articles by applying a layer of a coating composition containing finely dispersed iron particles and electroless deposition of copper by treating the said layer with an acid aqueous copper salt solution, a layer of an aqueous solution or dispersion of an organic polymer containing heteroatoms being applied and dried prior to application of the iron-containing coating.

The invention relates to a process for metallizing the surface of moldings of expanded plastics by the application of coatings containing finely divided iron and the electroless deposition of copper by treating the coatings with acid aqueous copper salt solution.

It is known that plastics can be metallized by first treating them with a dispersion containing a binding agent and iron in finely divided form and dipping the resultant coated article in a solution of a salt of a nobler metal so that this is deposited in electroless exchange for iron on the surface of the article. The iron dispersion used for this purpose should not be aqueous because otherwise rusting will occur; it therefore has to contain an organic solvent. Many plastics are however attacked by most organic solvents. Slight dissolution of the surface does not give much trouble in the case of compact plastics articles provided the surface structure is not lost, and may even often be desirable for achieving good adhesion of the coating. Expanded plastics are however much more sensitive to attack by solvents than compact moldings because of the thin walls of the cells. One drop of solvent which does not appreciably affect the surface structure of a compact plastics article immediately makes a hole in a foam article. Metallization of expanded articles composed of plastics which are readily soluble in organic solvents has hitherto been problematical unless use was made of expensive methods which are of little importance in practice.

It is an object of the present invention to provide a simple method for the metallization of expanded plastics articles.

We have found that metallization of the surface of an expanded plastics article composed of a foam which is readily soluble in organic solvents can be carried out in the way conventionally used for unexpected plastics by (a) applying a layer of a coating composition containing an organic solvent, dispersed iron particles having a particles size of less than 5 microns and a binder;
(b) drying or curing the coating; and
(c) electroless deposition of a layer of copper by treatment of the iron-containing coating with an acid aqueous solution of copper by applying to the surface of the expanded article a layer of an aqueous solution or dispersion of a film-forming polymer containing heteroatoms and drying it prior to the application of the iron-containing coating.

It is surprising that the polymer applied in solution or dispersion does not need to be composed of a polymer which is insoluble or particularly saparingly soluble in organic solvents, but that reinforcement of the superficial pore walls offers adequate protection even when a material is used which is soluble in solvents for the coating composition.

Naturally it is preferable for the coating material applied as an aqueous solution or dispersion not to be readily soluble in the solvent for the iron dispersion. The two should rather be correlated to each other.

The type of aqueous polymer solution used is not critical for the adhesion of the metal coating, nor is the type of dispersion if the dispersed polymer contains polar groups or heteroatoms, particularly carboxyl, urethane, ester, amide or sulfonic acid groups or halogen atoms or nitrile, keto, ether or sulfonyl groups. Heteroatoms include all atoms other than carbon and hydrogen atoms. The dispersed polymers used should therefore not consist exclusively of hydrocarbon units, i.e. they should not be polymers or copolymers of olefinically unsaturated hydrocarbons such as polyethylene, polybutadiene, polystyrene, styrene-butadiene copolymers or ethylene-propylene copolymers. Examples of suitable polymers are vinylidene chloride or vinyl chloride polymers containing at least 50 mole percent of copolymerized vinylidene cholride or vinyl chloride units; soluble copolymers of acrylonitrile, methacrylonitrile, acrylamide or methacrylamide. The following are particularly suitable: polyurethanes, homopolymers or copolymers of acrylic esters, methacrylic esters, vinyl ethers, vinyl esters and mixtures thereof with one another and particularly with olefinically unsaturated carboxylic acids having from three to five carbon atoms or their unsubstituted or N-substituted amides or olefinically unsaturated monomers containing hydroxyl groups, for example acrylic acid, methacrylic acid, crotonic acid, maleic acid, N-methylolacrylamide, N-methylolmethacrylamide, glycol monoacrylates, glycol monomethacrylates or allyl alcohol. Aqueous coating agents are particularly preferred which are crosslinkable at comparatively low temperatures, for example below 80° C. Examples of these are: (1) mixtures (prepared shortly prior to processing) of an aqueous solution or dispersion of a polyacrylate or polymethacrylate which contains hydroxyl groups and which has been reacted with epichlorohydrin and an aqueous solution or dispersion of a polyamine; (2) a dispersion or a drying oil or an aqueous solution of a maleized drying oil; or (3) an aqueous solution or dispersion of a polymer containing N-methylolamide groups which has been acidified shortly prior to processing.

The solids content of the aqueous solutions is generally from 10 to 50%, preferably from 15 to 25%, by weight, and that of the dispersions is generally from 30 to 60%, preferably from 45 to 55%. The solutions and dispersions may contain up to 10% by weight of a conventional additive, for example an inorganic pigment such as titanium dioxide. The polymer solutions and dispersions may be applied to the surface of the articles by conventional methods, for example by pouring, dipping, spraying or brushing. Drying of the coating is also carried out by a conventional method at room temperature or elevated temperature, the upper temperature limit being determined by the softning range of the expanded plastics. The thickness of the layer should generally not be less than 10 microns, preferably a thickness of from 100 to 1000 microns.

The coating composition containing finely divided iron which is to be applied to the dried coating just described contains from 30 to 70%, preferably from 50 to 55%, by weight of organic solvent, those conventionally used for surface coatings being suitable, for example tetrahydrofuran, toluene, xylene, methyl glycol acetate, ethyl glycol acetate, methyl ethyl ketone, ethyl acetate, cyclohexanone or mixtures of these solvents. The iron content of the coating composition is advantageously from 55 to 75% by weight with reference to the total solids content of the iron-containing coating composition. The size of the dispersed iron particles should be less than 5, advantageously less than 2, and preferably less than 1 micron. It is often advisable for the dispersion of iron particles in the solution of the binder in the organic solvent to be filtered through cotton wool or coarse filter paper prior to use.

For the choice of the binder of the iron-containing coating composition (which is advantageously used in concentrations of from 25 to 45% by weight with reference to the solids content) it is determinative that it should give a fairly hard coating. It should also ensure adhesion of the metal coating to the surface of the foam article which has been treated with the aqueous dispersion; this is often facilitated by a surface structure which is not smooth. Examples of suitable binders are: film-forming copolymers of vinyl chloride with comonomers such as vinyl esters, for example vinyl acetate or vinyl propionate, vinyl ethers of alcohols having from two to four carbon atoms, for example vinyl isobutyl ethers having at least 50% copolymerized units of vinyl chloride, corresponding copolymers of acrylates or methacrylates of alkanols having from two to four carbon atoms, and particularly substances which form polyurethanes or polyureas, i.e. mixtures (prepared shortly prior to processing) of polyisocyanates and compounds containing two or more alcoholic hydroxyl or amino groups such as are used for the production of polyurethane coatings, in the conventional amounts. Particularly suitable compounds containing hydroxyl groups are high molecular weight compounds having free hydroxyl groups, for example polyoxypropylated 1,1,1-trimethylolpropane or polyesters of aliphatic and/or aromatic dicarboxylic acids and alkanediols or alkanepolyols having free hydroxyl groups, and acrylic and methacrylic ester polymers containing hydroxyl groups, for example copolymers containing 1,4-butane-diol monoacrylate, if desired with low molecular weight compounds, for example di-(2-hydroxyethyl) adipate. Commercial polyisocyanates are suitable such as toluylene diisocyanate and trimers thereof and also the reaction products containing isocyanate groups of excess amounts of diisocyanate with aliphatic polyols, for example of three moles of toluylene diisocyanate with one mole of 1,1,1-trimethylolpropane. Obviously the said polymers and copolymers may be used mixed with each other or preferably with from 10 to 60% by weight of the said polyurethane-forming substances.

The iron dispersion advantageously also contains from 1 to 3% by weight of a higher monocarboxylic acid, particularly having from sixteen to eighteen carbon atoms or a salt of the same, such as stearic acid, oleic acid or copper oleate, as dispersing agent. The iron dispersion may be applied to the coated foam article by a conventional method, for example by pouring, spraying, dipping or brushing. The layer should be as thin as possible but obviously the article should be wetted all over. Generally the rate of application of the iron dispersion is from 50 to 150 g. per square meter so that after drying a layer thickness of from about 5 to 15 microns is obtained.

After the layer of iron-containing coating composition has been dried or cured, which may be carried out by a conventional method, it is treated, depending on its thickness and the desired degree of coppering, for about twenty to eighty minutes with an acid aqueous solution of a copper salt, preferably having a pH value of from 1.0 to 2.0, which may contain, in amount of up to 6% by weight of the solution, aminocarboxylic acids and/or polybasic carboxylic acids, for example glycocoll or glutamic acid, tartaric acid, citric acid or oxalic acid. There is thus formed on the surface a coherent layer of copper having a thickness of about 10 microns. When this treatment is over, the whole is washed with water to which at the beginning a little tartaric acid and/or oxalic acid may be added to avoid a precipitate of a small amount of iron hydroxide. After the copper coating thus obtained has been dried it has a resistance of from 0.06 to 0.6 ohm per cm.$^2$. The copper coating may be made thicker electrolytically or reductively with copper or any other metal or mixture of metals, especially nickel, cobalt, chromium or silver. The metal coatings obtained adhere so well to the foam article that in peeling tests the article is destroyed but the layer of metal is not separated from the foam.

Substrates suitable for the process according to this invention are all expanded plastics composed of polymers which are soluble in organic solvents, particularly homopolymers and copolymers of vinyl chloride and chiefly styrene and graft polymers and polymer mixtures containing polystyrene.

New composite materials thus obtainable may be used for example in the building industry for thermal insulation and/or for interior decoration. Metallized expanded plastics articles may be subdivided into any shape and also put together again. Toys, Christmas tree balls and other decorative articles, light reflectors, buoys, purposes on roofs and walls, and unbreakable Dewar flasks may be made particularly economically by this method.

The invention is illustrated by the following examples. The parts, when not otherwise stated, are parts by weight. Parts by volume bear the same relation to parts by weight as the liter to the kilogram.

EXAMPLE 1

A 50% aqueous dispersion of a copolymer of 80 parts of vinyl propionate and 20 parts of tert-butyl acrylate is applied at the rate of 5 g. per dm.$^2$ to a board of expanded polystyrene. After drying at room temperature, there is applied at the rate of 5.6 g. per dm.$^2$ a coating material which has been filtered through a paper filter candle and which has the following composition:

50 parts of a mixture of ethyl acetate, ethyl glycol acetate and xylene in the ratio 1:1:1;
35 parts of a finely dispersed iron having a particle size of about 0.5 micron;
13.5 parts of polyvinyl acetate; and
1.5 parts of stearic acid.

This layer is dried at room temperature and then treated for thirty minutes with a solution of a copper salt containing 150 parts of copper sulfate pentahydrate, 11 parts of sulfuric acid, 10 parts of glycocoll and 10 parts of triethanolamine per 1000 parts by volume of solution. After this treatment the layer is washed with a mixture of 20 parts of tartaric acid and 10 parts of oxalic acid per liter of water, then washed with water and dried. The resistance of the copper coating thus obtained is less than 0.2 ohm per cm.$^2$.

EXAMPLE 2

A 50% aqueous dispersion of a copolymer of 65.4 parts of vinylidene chloride, 28 parts of n-butyl acrylate, 6.1 parts of methyl acrylate and 0.5 part of acrylic acid is brushed onto a board of polyvinyl chloride foam at the rate of 5 g. per dm.$^2$ and then dried as in Example 1. The following mixture is filtered under pressure through cotton wool:

30 parts of a mixture of acetate and toluene (2:1);
55 parts of iron having a particle size of about 0.4 micron;
13.5 parts of polyoxypropylated 1,1,1-trimethylolpropane; and
1.5 parts of stearic acid.

From 1 to 2% of the iron remains in the filter. The mixture is diluted with 50 parts of cyclohexanone and then 10.8 parts of the adduct of 3 moles of toluylene diisocyanate to 1 mole of 1,1,1-trimethylolpropane is added. The mixture is sprayed within two hours at the rate of 2.8 g. per dm.$^2$ of foam surface, dried and the further procedure of Example 1 is followed. A foam article coated with an adherent layer of copper is obtained.

We claim:

1. In a process for the metallization of the surface of articles of expanded polystyrene or expanded polyvinyl chloride wherein (a) a layer of coating composition containing from 30 to 70% by weight of an organic solvent, 55 to 75% by weight with reference to the total solids content of dispersed iron particles having a particle size of less than 5 microns and from 25 to 45% by weight with reference to said solids content of a film-forming binder is applied to said articles to form a coating;

(b) the coating is dried or cured; and (c) treating the iron containing coating with an acid aqueous solution of a copper salt to form a layer of copper on the surface of said coating, the improvement which comprises:

applying to the surface of said expanded polystyrene or expanded polyvinyl chloride articles, prior to the application of the iron-containing coating, a layer of an aqueous solution or dispersion of an organic polymer containing polar group selected from the group consisting of carboxyl, urethane, ester, amide, sulfonic acid, nitrile, keto, ether, hydroxyl, or sulfonyl groups or halogen atoms, and drying said aqueous solution or dispersion.

2. A process as claimed in claim 1 wherein the surface is expanded polystyrene.

3. A process as claimed in claim 1 wherein the aqueous solution or dispersion of the organic polymer containing polar groups is a 15 to 25% solution or a 45 to 55% dispersion.

4. A process as claimed in claim 1 wherein the particle size of the iron is less than 2 microns.

5. A process as claimed in claim 1 wherein the particle size of the iron is less than 1 micron.

6. A process as claimed in claim 1 wherein a layer of a metal selected from the group consisting of copper, nickel, chromium or silver is applied upon said layer of copper.

7. A process as claimed in claim 1 wherein the aqueous solution or dispersion of the organic polymer containing polar groups is applied so as to form a layer having a thickness of from 100 to 1000 microns.

8. A process as claimed in claim 1 wherein the aqueous solution or dispersion of the organic polymer containing polar groups is a 10 to 50% solution or a 30 to 60% dispersion.

9. A process as claimed in claim 1 wherein the iron-containing coating composition contains from 1 to 3% by weight of a monocarboxylic acid having 16 to 18 atoms as dispersing agent.

References Cited

UNITED STATES PATENTS

| | | | |
|---|---|---|---|
| 3,226,256 | 12/1965 | Schneble, Jr. et al. -- | 117—71 X |
| 3,305,460 | 2/1967 | Lacy ------------- | 117—71 X |
| 3,476,530 | 11/1969 | Ehrreich et al. ----- | 117—71 X |

ALFRED L. LEAVITT, Primary Examiner

C. K. WEIFFENBACH, Assistant Examiner

U.S. Cl. X.R.

117—62, 72, 138.8, 217, 218